United States Patent [19]

Bechu et al.

[11] Patent Number: 4,750,763
[45] Date of Patent: Jun. 14, 1988

[54] DEVICE FOR ANCHORING A FLEXIBLE TUBULAR SYSTEM ON A RIGID SHOULDER BY MEANS OF AN ARMATURE WITH LINKED SEGMENTS

[75] Inventors: Jean-Pierre Bechu, Courbevoie; Bernard Daignot; Claude Roux, both of Decize, all of France

[73] Assignee: Caoutchouc Manufacture et Plastiques, Bezons, France

[21] Appl. No.: 864,515

[22] Filed: May 19, 1986

[30] Foreign Application Priority Data

May 17, 1985 [FR] France .................. 85 07584

[51] Int. Cl.$^4$ ............................ F16L 23/02
[52] U.S. Cl. ................... 285/229; 285/405; 285/162; 285/200; 285/213
[58] Field of Search ......... 285/162, 200, 229, 4, 285/213, 414, 214, 405, 411, 921; 248/56; 16/2; 29/512, 513; 174/153 G

[56] References Cited

U.S. PATENT DOCUMENTS

| | | | |
|---|---|---|---|
| 1,640,543 | 8/1927 | Gudge | 16/2 |
| 1,851,758 | 3/1932 | Eger | 285/200 |
| 2,285,319 | 6/1942 | Wheeler | 277/192 |
| 2,298,736 | 10/1942 | Harpfer | 285/368 |
| 2,692,782 | 10/1954 | Jones | 285/229 |
| 2,710,630 | 6/1955 | Greer | 285/208 |
| 2,879,804 | 3/1959 | Hammond | 285/229 |
| 2,998,986 | 9/1961 | Buono | 285/229 |
| 3,131,954 | 5/1964 | Kramer et al. | 285/414 |
| 3,537,732 | 11/1970 | Cook | 285/200 |
| 3,837,178 | 9/1974 | Hackforth | 285/200 |
| 4,155,573 | 5/1977 | Ehlers | 285/229 |
| 4,241,944 | 12/1980 | Clark | 285/229 |

FOREIGN PATENT DOCUMENTS

| | | | |
|---|---|---|---|
| 1273930 | 7/1968 | Fed. Rep. of Germany | 285/229 |
| 2055898 | 5/1972 | Fed. Rep. of Germany | 285/229 |
| 2606180 | 8/1977 | Fed. Rep. of Germany | 285/229 |
| 2701320 | 7/1978 | Fed. Rep. of Germany | 285/405 |
| 2824704 | 2/1979 | Fed. Rep. of Germany | 285/405 |
| 2914375 | 10/1980 | Fed. Rep. of Germany | 285/229 |
| 2006730 | 4/1969 | France . | |
| 2033789 | 11/1970 | France . | |
| 2127561 | 9/1972 | France . | |
| 2232239 | 12/1974 | France | 285/229 |
| 2280853 | 7/1975 | France . | |
| 2447512 | 1/1980 | France . | |
| 1494473 | 12/1977 | United Kingdom | 285/405 |

OTHER PUBLICATIONS

Dilatoflex "NT" Technical Dossier 79–Bai.
Performer Adio Pipe Catalog, Endlfex System, p. 4.
Performer Adio Catalog FC175-18, Dilatoflex, "K", Jun. 1984.
Stenflex Catalog #2, Jun. 1984, 2 pages, General Rubber Corp., Style 1010, 4 pages.

Primary Examiner—Gary L. Smith
Assistant Examiner—Eric K. Nicholson
Attorney, Agent, or Firm—Antonelli, Terry & Wands

[57] ABSTRACT

Radial device for anchoring a flexible tubular structure in an opening in a rigid wall, characterized by flexible tubular structure having a bead reinforced by an armature with linked segments, embedded in rubber, composed of segments made integral by a nonrigid linking element in order to allow bead to bend in the axial direction so that it can slide into the hole in rigid wall.

The invention applies to any industrial assembly, for example expansion joints, or any assembly on a vehicle, such as air suspension diaphragms.

18 Claims, 6 Drawing Sheets

FIG_1a PRIOR ART

FIG_1b

FIG_2

FIG_3

FIG_4

FIG_9

FIG_10

FIG_11

DEVICE FOR ANCHORING A FLEXIBLE TUBULAR SYSTEM ON A RIGID SHOULDER BY MEANS OF AN ARMATURE WITH LINKED SEGMENTS

BACKGROUND OF THE INVENTION

The present invention relates to a system for anchoring traction elements of a flexible tubular structure to an opening in a rigid wall, with the anchoring being achieved by pressing axially on a shoulder or flange after passage through an opening provided in the rigid wall. In this text, to simplify the disclosure of the invention, the term "sleeve" will be used to define the flexible annular structure and the term "bead" will define the end of the sleeve which has a larger diameter than that of the sleeve and which abuts the rigid wall, hereinafter called a "mating flange."

Sleeve with a flexible bead are known wherein the bead generally has an internal armature, i.e. embedded in the rubber, of annular form, composed of high-modulus rubber, a textile ply, a textile or metal strand, or a flexible spring. This type of reinforcement is adopted to render the bead deformable to permit mounting mating flanges after manufacture of the sleeve, by forcing the bead through the bore. The major drawback of these systems is the requirement of pinching of the flat flange between two planes, according to the device adopted, for example, by the Societe Kleber Industrie for its Dilatoflex NT expansion sleeves (technical dossier 79-BA1), or by the use of a form, obtained by maching, for a rigid part to abut a diameter inside this deformable bead, as for example in the air suspension diaphragms described in the French Pat. No. 2,127,561, or in the expansion sleeves described in French patents FR No. 2 280 852, FR No. 2 033 789 or FR No. 2 006 730.

These sleeve systems with flexible beads thus require mounting techniques which often cause a strong stress concentration at the end of the mating flange, which can go as far as damaging or even destroying the sealing function. Hence, the usual sleeves with flexible beads can only be used for moderate service pressures. To overcome these drawbacks, solutions of rigid sleeves with large contact areas with the flange have been proposed in, for example U.S. Pat. No. 2,998,986. This is in fact the solution adopted by Kleber Industrie for its built-in pipe flanges, the Endflex system described in the performer AD10 pipe catalog, page 4 or in its Dilatoflex K expansion sleeves described in catalog FC175-18, June 1984.

All these devices have high rigidity and are usually built with metal elements. Because of their design, rubber is compressed over a large contact surface area which improves stress distribution and reduces creep sensitivity, thus providing a better guarantee of tightness and the possibility of utilization at high service pressures.

However, due to their rigidity, these beads have the drawback of making it impossible to mount one-piece mating flanges after manufacture of the sleeve. Hence it is necessary to mount said mating flanges during production and to vulcanize the sleeve thus equipped with these metal parts, which considerably augments the weight and volume.

In addition, mating flanges are no longer demountable as shown by thus, the Stenflex and General Rubber catalogs. The sleeve manufacturer must keep a large inventory on hand so that sleeves equipped with flanges conforming to the various standardized connections are available.

A sleeve with demountable flanges is described in French Pat. No. 2447512 but the beads are rigid and have reinforcing collars separate from the sleeve. The proposed solution, which consists of surrounding the collar by a U-shaped rubber form, requires a very complex mold to be built.

As can be seen from the above analysis, a solution conforming to the state of the art which enables the requirements of anchoring quality (to withstand high service pressures or pulls), and ease of mounting on a flange or rigid shoulder to be met, is not known.

Hence, the object of the invention is to provide an anchoring device which offers the advantages of the two types of known beads without suffering their disadvantages. The anchoring is obtained by a bead having a large contact surface on the flange or shoulder, while offering flexibility allowing bending for passage of the bead through the bore.

Thus, the invention permits simpler manufacture of the sleeve by eliminating the weight and volume problems engendered by the necessity (in previously known solutions) of mounting the mating flanges during manufacture moreover and this represents an essential saving, it considerably reduces the need to maintain a large parts inventory due to the various connections since the same range of sleeves can be equipped with the various types of commercial or customized mating flanges at the time of delivery. Management and marketing of the sleeves is thus greatly facilitated and delivery times are considerably reduced.

The invention consists of a radial device for anchoring flexible tubular structures such as rubber hoses, deformable collars, expansion joints, and suspension diaphragms in an opening in a rigid wall by abutting a shoulder or flange after passing through an opening or hole in the rigid wall, characterized by the flexible tubular structure, or sleeve, having at least one bead reinforced by an armature with linked segments embedded in the rubber, composed of rigid elements made integral, by a flexible linking element of any type, to facilitate manufacture but allow the segments to move with respect to each other at the time of assembly, to allow the bead to bend so it can slide into the bore of the rigid wall without altering, after return to the plane shape, the radial rigidity which confers on the bead the necessary strength for its proper operation in service when it is compressed between the flange and the mating flange.

The essential element of the invention is comprised of the bead-reinforcing armature, with linked segments formed of a metal or plastic hoop with high rigidity composed of segments with varied geometric shapes, made integral with each other. The only purpose of the linking element is to join the individual segments of the armature together to form a kind of chain facilitating positioning of the armature in the bead at the time the sleeve is made. Because it is flexible, it plays no role in reinforcing the bead and does not prevent the formation of rubber bridges, i.e. physical and chemical links between the rubber-based mixtures located in the mold above and below the armature with linked segments.

At the time of manufacture, the armature is in a single piece, like a chain, which facilitates a handling and positioning in the mold. The armature may be positioned in the mold by placing the armature with linked segments directly in the mold itself; or, in a premanufacturing phase, by disposing the armature on a support comprising a layer of rubber-based mixture, with or without a textile base.

The length of the linking element between two individual consecutive segments of the armature is generally between 0.05 and 0.30 times a width of a segment, as a function of the desired flexibility of the bead, in order to allow the bead to bend mechanically radially when it is mounted in the connecting mating flange.

At the time the sleeve is made, the armature, with linked segments, can be placed in the bead either bare or wrapped in a ply of rubber mixture or of a fine textile material, the latter two possibilities having the advantages of protecting the carcass of the sleeve from damage when it contacts the edges of the armature with linked segments.

The segments, whether or not they adhere to one another, embedded in the rubber, after vulcanization form an armature rendering the bead rigid, due to the high compression rigidity of the "rubber bridges" cited above. However, these segments articulate with each other without damaging the reinforcing carcass of the sleeve and permit the bead to pass into the bore when said bead, which has become flexible, is bent, whereby the bead re-opens on the shoulder naturally after the mating flanges have been put in place. The bead, pinched between the connecting flange and the mating flange or the shoulder, retains a radial rigidity equivalent to that of a bead with a one-piece armature by the self-pinching effect.

The segments of the armature are preferably made of a metal such as steel, aluminum, Zamak, or any other material (reinforced or composite plastic) whose tensile modulus is greater than 1500 MPa.

The linking element is usually made of a wire or textile ply, of a wire or metal cable, of a plastic strand or fiber, of an elastic bracelet, or of a strip or disk of adhesive material.

The number of segments of which the armature with linked segments is composed is preferably between seven and thirteen, but it can be as large as the strength of the material and manufacturing economics permit.

The general shape of the segments is usually trapezoidal, but other possibilities may be considered such as rectangular, triangular, lozenge, or double trapezoidal shapes, cited as nonlimitative examples which shapes would complicate manufacture of the armature segments but would not interfere with their operation.

BRIEF DESCRIPTION OF THE DRAWINGS

The characteristics and variants of the invention will be better understood by reading the description hereinbelow with reference to the drawings, wherein.

DETAILED DESCRIPTION

Figure 1A:
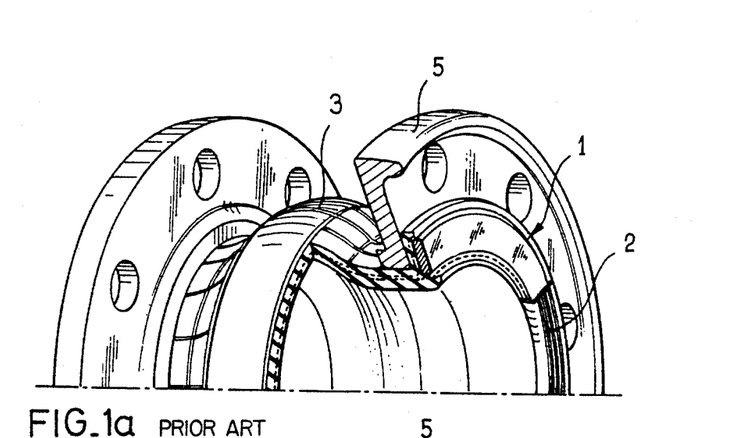
FIG. 1a is a cutaway view of the bead of an expansion sleeve having a conventional armature.
Figure 1B:
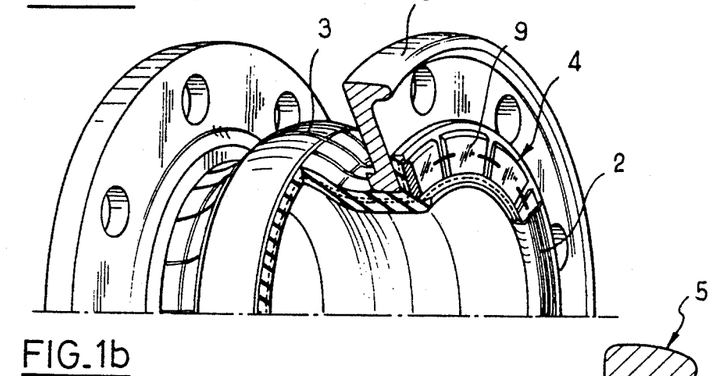
FIG. 1b is a cutaway view of a bead of an expansion sleeve having linked segments constructed in accordance with the present invention.

FIG. 1a shows the armature (1) of bead (2) of a conventional expansion sleeve (3) with a rigid bead supplied with its mating flange (5) and FIG. 1b shows the armature with linked segments (4) of bead (2) replacing it according to the invention. The figure represents the part that would be obtained after elimination of the upper rubber layer of bead (2) thus stripped down to its armature (1) or (4) as the case may be.

Figure 2:
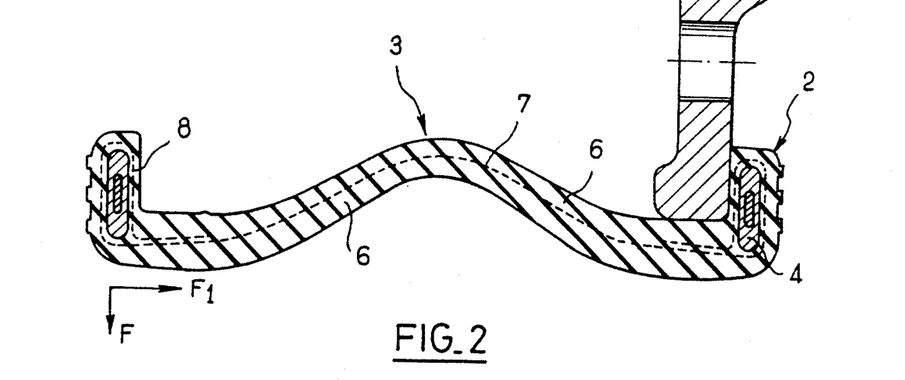
FIG. 2 shows the structure of a flexible sleeve having beads.

FIG. 2 shows, in cross section, the structure of a sleeve (3) whose rubber body (6) is reinforced with a carcass of textile or metal plies (7) whose beads (2), which rest on the shoulder or mating flange (5), are reinforced by armatures with linked segments (4). Here one may see how carcass (7) surrounds armature (4) in the vicinity of beads (2) at (8).

FIG. 2 also shows the force F which develops when the sleeve is pressurized, locking the segments of armature (4) against each other in a self-squeezing action without said segments being displaced. Force F1 is the tractive force exerted on textile or metal carcass (7) of sleeve (3). The resistance to the tractive force F1 is not affected by the relative flexiblity of the armature, and the performance of sleeve (3) remains substantially identical in service to that which would be obtained with a sleeve with beads reinforced by continuous rigid armatures.

Figure 3:
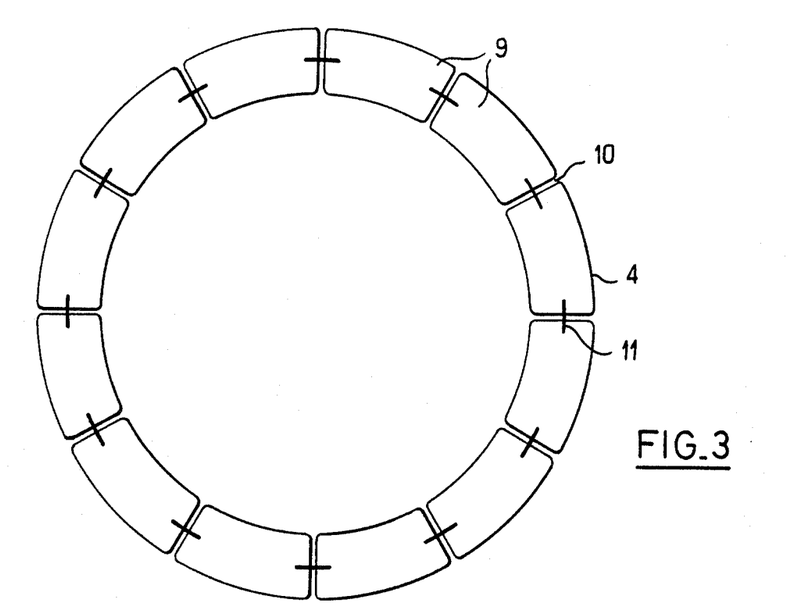
FIGS. 3, 4, and 5 represent various embodiments of the armature with linked segments for reinforcement of the bead.

In FIG. 3, representing the most usual configuration of the armature with linked segments, the armature.

(4) is composed of twelve segments (9) of the same size, generally trapezoidal in shape, made integral by a metal ring (11).

Figure 4:
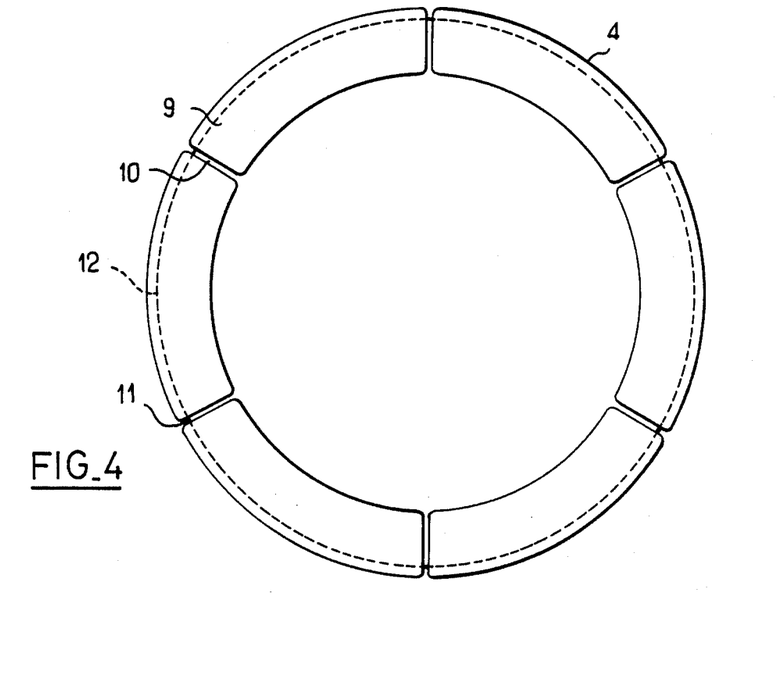

FIG. 4 shows another configuration of an armature with linked segments (4) wherein the number of individual segments (9) is limited to six. In FIG. 4, segments (9) are all of the same size with the linking element (11) being an elastic bracelet engaged in a groove (12) placed at the outermost part of segments (9).

Figure 5:
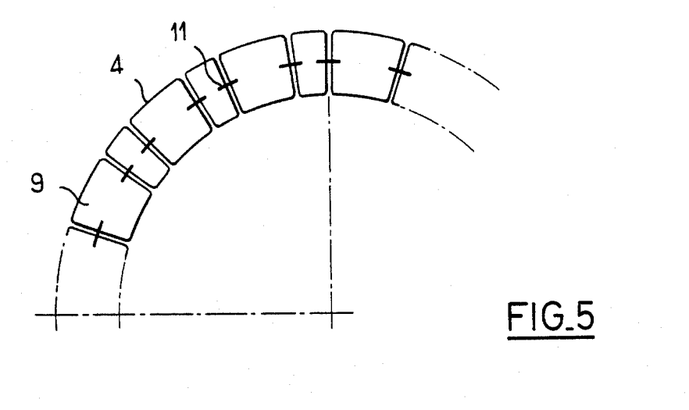

FIG. 5 illustrates an alternative embodiment of an armature with linked segments (4) wherein there are thirty-two segments (9), of a general trapezoidal shape, of different sizes and arranged alternately: one large segment/one small segment. Linking element (11) is a continuous textile cord which allows the segments to be threaded on it.

Figure 6:
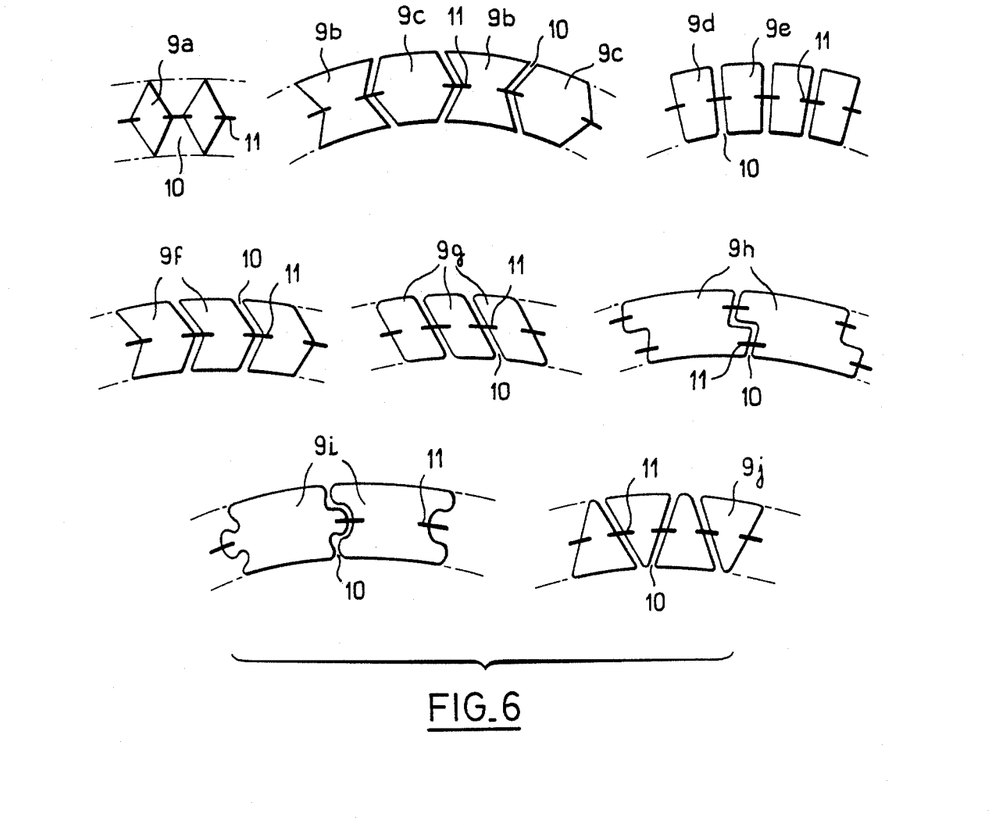
FIG. 6 illustrates the different shapes that the segments of the armature with linked segments may have.

FIG. 6 shows, as nonlimitative examples, some of the shapes segments (9) of armature with linked segments (4) may have.

Thus, segments (9a) are lozenge-shaped and have between them a zone (10) with a large surface area for linking the rubber-based mixtures surrounding the armature with linked segments.

Segments (9b) and (9c) have a double-trapezoidal shape and are linked by the small bases in case (9b) and by the large bases in case (9c). Shapes (9b) and (9c) are generally used together and have a separation zone (10) with a small surface area between them. It would also be possible to combine only segments with shape (9b) or segments with shape (9c), which would increase the flexibility of the bead by increasing the surface area of the separation zone, allowing for rubber bridges to separate two neighboring segments. These configurations are not shown in the drawings.

Shapes (9d) and (9e) are substantially rectangular and can be separated by a zone (10) with the width desired for the flexibility of the bead.

Chevron shapes (9f) or more complex shapes such as (9h) and (9i) can be used in a quasi-interlocking structure or with a separation zone (10) of the desired width between two or more segments.

With the parallelepipedic shape (9g) it is possible to obtain, as with shapes (9b), (9c), (9h), (9i), and (9j), a greater pinching effect than with shapes (9a), (9d), and (9e) because of the very shape of the segments.

Triangular shapes (9j) lend themselves to mounting as shown in the drawing as an assembly (not shown) where all the vertices or all the bases of the triangular segments would be directed toward the center of the armature with linked segments. The latter configuration leaves a wider separation zone (10) between two successive segments (9) and hence increases the flexibility of bead (2).

Linking elements (11) can be formed by any appropriate means to establish a flexible or articulated link between two consecutive segments.

Figure 7A:
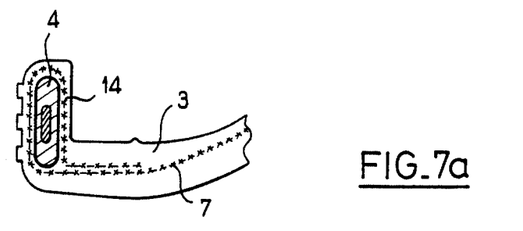
FIGS. 7a–7d show various ways of manufacturing the armature of the bead.

FIG. 7a shows a possibility of protecting the reinforcing carcass (7) of sleeve (3) by surrounding armature (4) with a protective ply (14) composed of a mixture based on rubber or a fine textile to protect said reinforcing carcass (7) from damage when in contact with the edges of segments (9) of armature with linked segments (4). This structure is obtained during the pre-manufacturing phase of the sleeve's armature.

Figure 7B:
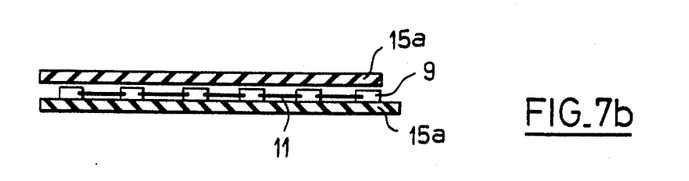
Figure 7C:
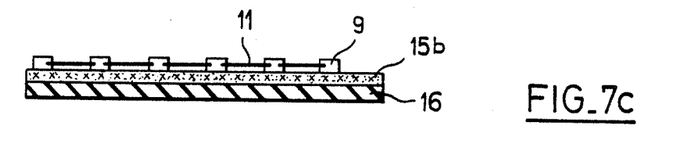
Figure 7D:
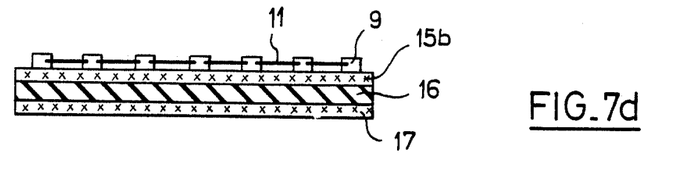

FIG. 7b shows such a method of pre-manufacturing the armature with linked segments from the protective plies of rubber (15a) while FIGS. 7c and 7d show schematically how protective textile ply (15b) is laid on a crude rubber sheet (16), serving as a support, either along as in FIG. 7c or integral with a textile substrate (17) as in FIG. 7d.

FIG. 8 shows various methods of making the element (11) which links segments (9) of armature (4).

Figure 8A:
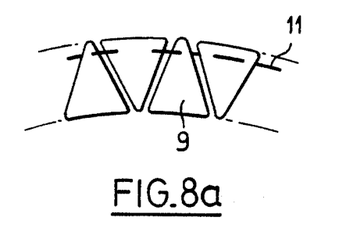
FIGS. 8a–8i show schematically various ways of making the linking element.

In FIG. 8a, segments (9), triangular in shape, are threaded onto a continuous cord made of textile, metal, or plastic, constituting linking element (11), like beads on a necklace string.

Figure 8B:
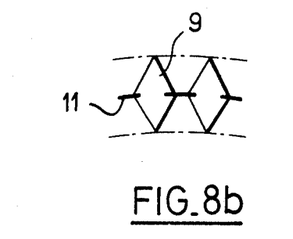

In FIG. 8b, segments (9), which are lozenge-shaped, are connected by rings constituting linking element (11).

Figure 8C:
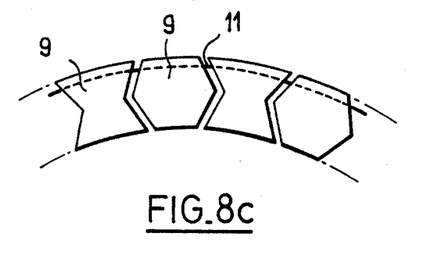
Figure 8D:
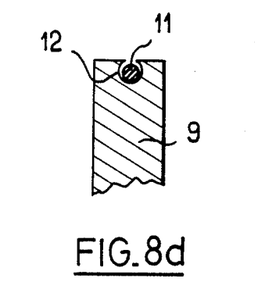

In FIGS. 8c and 8d, segments (9), in the shape of a double trapezoid, are connected by an elastic bracelet comprising linking element (11). This elastic bracelet is engaged in a groove (12) formed at the periphery of segment (9).

Figure 8E:
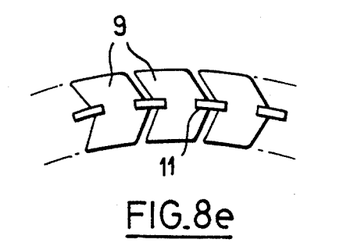
Figure 8F:
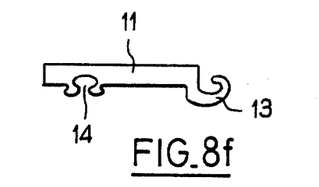

In FIG. 8e, segments (9) are chevron-shaped and connected by an articulated anchoring system forming linking element (11) in which, as shown in FIG. 8f, the head of a round hook (13) is force-fitted into recess (14) of the following linking element.

Figures 8G, 8H, 8I:
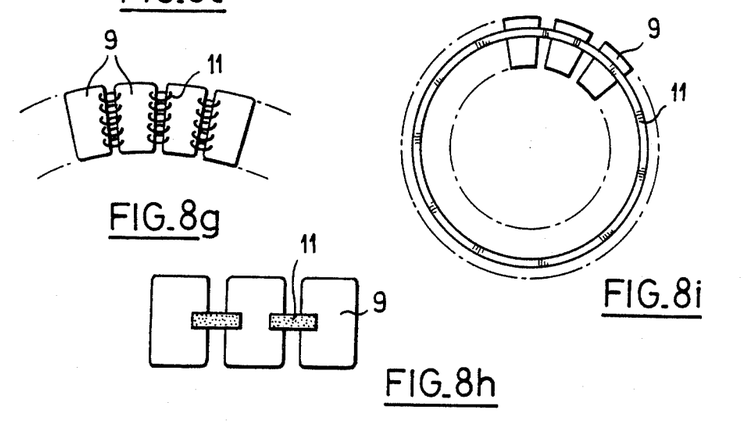

In FIG. 8g, segments (9) are parallelepipedic in shape and connected by a spiral binding constituting linking element (11).

In FIGS. 8h and 8i, linking element (11) is a strip of material with sufficient adhesion to segments (9) to join them. This linking element can be discontinuous as in FIG. 8h or continuous, for example, disk-shaped, as in FIG. 8i.

It can be made of a rubber with high sticking ability when crude or an adhesive strip on a flexible substrate.

Of course, all the linking elements (11) can be associated with all shapes of segments (9) to form an armature (4) composed of segments linked flexibly together or an articulated armature which allows the bead of the finished article to be bent so that it can be introduced into the bore of the mating flange.

Figure 9:
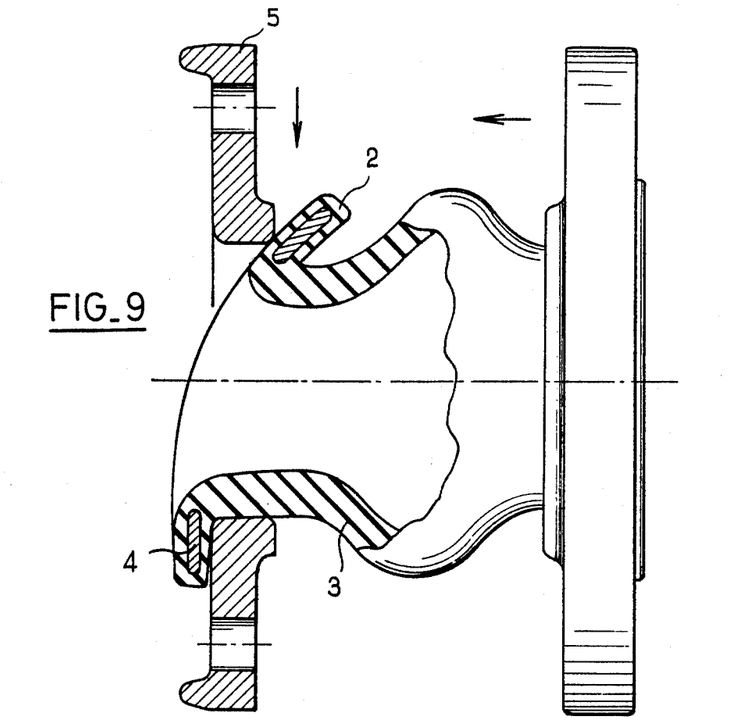
FIG. 9 shows the principle of mounting the mating flanges.

FIG. 9 shows the mounting of mating flanges (5) on sleeve (3) by forced passage of bead (2), comprising armature with linked segments (4) through the bore of the mating flange.

Figures 10, 11:
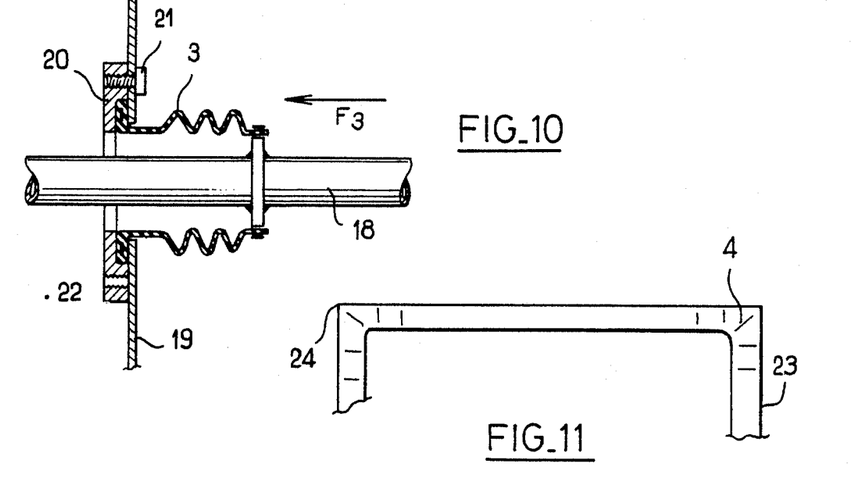
FIGS. 10 and 11 show, as nonlimitative examples, some particular applications of the invention.

FIG. 10 illustrates an application of the invention to passage through a partition or wall (19) (for example that of a tank or rigid pipe) of a pipe, a rod, or a sheath (17) held by a sleeve (3) by means of a flange (20) fastened by bolts (21) when inner part (22) is inaccessible. Arrow F3 indicates the mounting direction.

The above figures have usually been illustrated by the application to bodies of revolution, but the anchoring device proposed is not limited to this type of part; its operation would be just as satisfactory for mounting on parts with an oval or rectangular opening.

FIG. 11 shows a nonlimitative example of a rectangular opening such as a ventilation shaft (23) in which armature with linked segments (4) would be inserted only into the angular zones (24) of the shaft.

The applications of the invention are not limited to the cases illustrated. Among other possibilities, it is advantageous to use the system described in the invention for anchoring ends, which are then overmolded with rubber, tension or prestress cables, or for anchoring in openings of any shape in flexible emergency evacuation devices in buildings.

As may be seen from the above description and illustrations, the proposed anchoring device allows easy mounting of a sleeve, a sheath, or any other flexible object of tubular shape on a rigid form, the only condition being that the object to be anchored by supplied with a bead whose armature, according to the invention, is composed of segments linked in a non-rigid manner.

In this way the invention avoids handling heavy and voluminous parts which complicate sleeve manufacturing molds or tools. It reduces the need to stock a wide variety of sleeves, each of which has standardized-connection mating flanges; it also decreases the areas necessary for storage since sleeves without mating flanges are less voluminous than those so equipped; it simplifies filling of orders by allowing different types of mating flanges to be mounted for a given diameter; hence, due to these advantages, it permits an appreciable gain in productivity and improves working conditions when sleeves are manufactured.

Finally, if a sleeve is damaged, the mating flanges can be removed and re-used on a replacement sleeve, which represents a non-negligible saving.

The individual skilled in the art can, of course, make various modifications to the device described above and its applications illustrated as nonlimitative examples without departing from the scope of the invention.

What is claimed is:

1. Radial device for anchoring flexible tubular structures in an opening in a rigid wall by abutting a flange after passage through a bore made in said rigid wall, characterized by the fact that the flexible tubular structure has at least one bead reinforced by an armature with linked segments, embedded in a rubber mix, said segments connected together by a non-rigid linking element so that said bead will bend by folding in the axial direction, and will slide into the bore in the rigid wall without a radial rigidity of the bead being affected, thereby enabling a mounting of various types of mating flanges at the time of delivery rather than during a manufacturing of the flexible tubular structure.

2. Anchoring device according to claim 1, characterized by segments of armature of bead having the same geometrical shape.

3. Anchoring device according to claim 1, characterized by a length of a linking element between two consecutive segments of the armature being between 0.05 and 0.30 times a width of one of said segments.

4. Anchoring device according to claim 3, characterized by a set of segments of the armature being connected together by a single, flexible, continuous linking element.

5. Anchoring device according to claim 3, characterized by said linking element being an elastic bracelet engaged in a groove provided at a periphery of the segments of the armature.

6. Anchoring device according to claim 1, characterized by the armature with the linked segments being composed of alternating segments with difference geometrical shapes.

7. Anchoring device according to claim 1, characterized by the segments of the armature of the bead being made of metal having a tensile modulus equal to at least 1500 MPa.

8. Anchoring device according to claim 1, characterized by the number of segments of the armature with linked segments which reinforces the bead being eight, twelve, sixteen, or twenty-four.

9. Anchoring device according to claim 1, characterized by the linking element of the segments of the armature being composed of a textile material.

10. Anchoring device according to claim 1, characterized by the linking element of the segments of the armature form an articulated system.

11. Anchoring device according to claim 1 characterized by the linking element of the segments of the armature being composed of a spiral binding.

12. Anchoring device according to claim 1, characterized by the linking element of the segments of the armature being composed of a strip made of an adhesive material.

13. Expansion sleeve characterized by the at least one bead having a radial anchoring device according to claim 1.

14. Flexible hose including integral flanges, characterized by the at least one bead having a radial anchoring device according to claim 1.

15. Air suspension diaphragm characterized by the at least one bead having a radial anchoring device according to claim 1.

16. An anchoring device according to claim 1, characterized by the segments of the armature of the bead being made of a plastic material having a tensile modulus equal to at least 1500 MPa.

17. An anchoring device according to claim 1, characterized by the linking element of the segments of the armature being composed of metal rings.

18. An anchoring device according to claim 1, characterized by the linking element of the segments of the armature being composed of a disk made of an adhesive material.

* * * * *